United States Patent
Herle et al.

(10) Patent No.: US 7,013,391 B2
(45) Date of Patent: Mar. 14, 2006

(54) APPARATUS AND METHOD FOR SECURE DISTRIBUTION OF MOBILE STATION LOCATION INFORMATION

(75) Inventors: Sudhindra Pundaleeka Herle, Plano, TX (US); Bryan Jeffery Moles, Dallas, TX (US); Cary Scott Pillers, Garland, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 752 days.

(21) Appl. No.: 10/033,341

(22) Filed: Dec. 26, 2001

(65) Prior Publication Data

US 2003/0035544 A1    Feb. 20, 2003

Related U.S. Application Data

(60) Provisional application No. 60/312,556, filed on Aug. 15, 2001.

(51) Int. Cl.
*G06F 1/24* (2006.01)
(52) U.S. Cl. ................. 713/182; 713/200; 713/201
(58) Field of Classification Search ................ 713/182, 713/200, 201
See application file for complete search history.

(56) References Cited

U.S. PATENT DOCUMENTS

| | | | | |
|---|---|---|---|---|
| 5,812,609 | A | * | 9/1998 | McLochlin ................. 375/340 |
| 5,890,068 | A | * | 3/1999 | Fattouche et al. ........ 455/456.2 |
| 5,939,571 | A | * | 8/1999 | Foidl ........................... 554/12 |
| 6,014,102 | A | * | 1/2000 | Mitzlaff et al. ............. 342/457 |
| 6,204,844 | B1 | * | 3/2001 | Fumarolo et al. ........... 715/736 |
| 6,266,013 | B1 | * | 7/2001 | Stilp et al. .................. 342/387 |

* cited by examiner

*Primary Examiner*—Thomas R. Peeso

(57) ABSTRACT

A mobile station location server determines the mobile station's location through various location techniques or by receiving the location information from the mobile station over an encrypted channel. The server stores the location in memory that may be access by authorized client access devices. A requesting client access device transmits a request to the server over the Internet. The server authenticates the request to verify that the client access device is authorized to receive the location information. If the client access device is authorized, the server can then transmit the information in either an encrypted or decrypted form to the device.

20 Claims, 4 Drawing Sheets

APPARATUS AND METHOD FOR SECURE DISTRIBUTION OF MOBILE STATION LOCATION INFORMATION

The present invention claims priority to U.S. Provisional Application Ser. No. 60/312,556 filed on Aug. 15, 2001.

TECHNICAL FIELD OF THE INVENTION

The present invention is directed, in general, to wireless access systems and, more specifically, to system and method for providing secure access to mobile station location information to authorized persons.

BACKGROUND OF THE INVENTION

Wireless mobile stations will soon be required to be able to determine their geographic location. This location information is required to be relayed only to the wireless service provider or a Public Service Access Point (PSAP) (e.g., emergency personnel).

Various methods exist in the art for a wireless mobile station to determine its location. For example, the mobile station can use received signal strength indications from multiple base stations to triangulate its position. Additionally, the mobile station may have a global positioning system (GPS) receiver that can receive signals from the GPS satellite constellation in order to determine its position to within a few feet.

While this position information is necessary for emergency purposes, it would also be useful for targeting commercial services to the mobile station's user. However, the location information is provided only to emergency services personnel or to location technology-enabled devices that have access to the precise location information. There is a resulting need for a way to make this location information available to select individuals and/or organizations.

SUMMARY OF THE INVENTION

To address the above-discussed deficiencies of the prior art, it is a primary object of the present invention to provide a mobile station's geographic location to authorized client access devices.

The present invention encompasses an apparatus for transferring geographic location information associated with the mobile station to a server accessible via a communication network coupled to the wireless network. The apparatus comprises memory that stores mobile station current position information and at least one encryption/decryption key.

The apparatus further comprises a controller, coupled to the memory, that is capable of determining the geographic location information and storing it in the memory. The controller is additionally capable of establishing a secure connection with the server, using the at least one encryption/decryption key, over the wireless network over which the geographic location information is transmitted.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any mobile station for use in a wireless access system.

Figure 1:
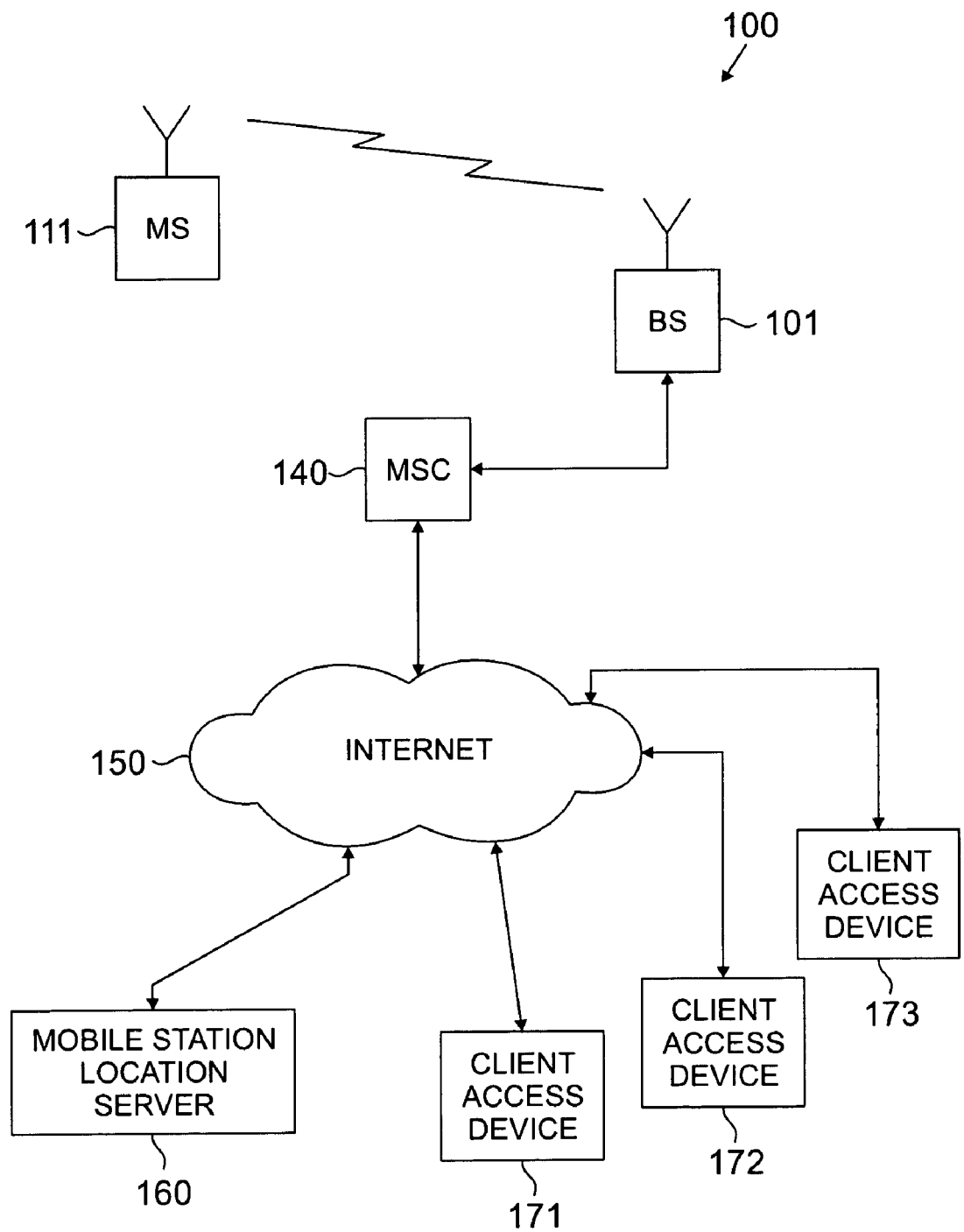
FIG. 1 illustrates selected portions of an exemplary telecommunication network in which a mobiles station according to the principles of the present invention may operate.

FIG. 1 illustrates selected portions of an exemplary telecommunication network 100 in which a mobiles station according to the principles of the present invention may operate. An example of one such telecommunication network is a cellular telephone network. The present invention, however, is not limited to any one type of telecommunication network.

Base station 101 communicates with at least one mobile station is (MS) 111 over, for example, code division multiple access (CDMA) channels, time division multiple access (TDMA) channels, frequency division multiple access (FDMA) channels, or the like. Mobile station 111 may be any suitable wireless device, including a conventional cellular radiotelephone, PCS handset device, personal digital assistant, portable computer, or metering device.

In one embodiment of the present invention, BS 101 comprises a base station controller (BSC) and one or more base transceiver stations (BTS). A base station controller is a device that manages wireless communications resources, including the base transceiver stations, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers.

For the purpose of simplicity and clarity in explaining the operation of the present invention, only one base station and one mobile station are illustrated. In alternate embodiments, however, telecommunication network 100 would typically be comprised of a plurality of base stations that communicate with a plurality of mobile stations.

BS 101 transfers voice and data signals between MS 111 and the Internet 150 via communication lines and mobile switching center (MSC) 140. The communication lines may be any suitable connection means, including a T1 line, a T3 line, a fiber optic link, a network backbone connection, or any other type of data connection. MSC 140 is well known to those skilled in the art.

MSC 140 is a switching device that provides services and coordination between the subscribers in a wireless network and external networks, such as the public switched telephone network (PSTN) or Internet 150. In some embodiments of the present invention, the communication lines may be several different data links where each data link couples a plurality of base stations with the mobile switching center.

Mobile station location server 160 is coupled to the Internet 150 through a communication line as described above. Mobile station (MS) location server 160 may be operated by a wireless service provider, such as AT&T, SPRINT, or another type of service provider. MS location server 160 is a computer server comprising a controller such as a data processor and memory. A server of the present invention is subsequently illustrated in greater detail with reference to FIG. 3.

MS location server 160 may be accessed through Internet 150 by a plurality of client access devices, including exemplary client access devices 171, 172 and 173. Client access devices 171, 172 and 173 may include any type of device that can operate over a TCP/IP network (such as Internet 150) or a similar conventional communication network. Client access devices 171–173 may be, for example, personal computers (PCs), other data servers, personal digital assistant (PDA) systems, telephones, or the like.

For purposes of clarity, only three client access devices are illustrated in FIG. 1. In reality, hundreds of thousands or even millions of client access devices may be able to access MS location sever 160. Additionally, client access devices may be local to the mobile station location server or thousands of miles away.

Figure 2:
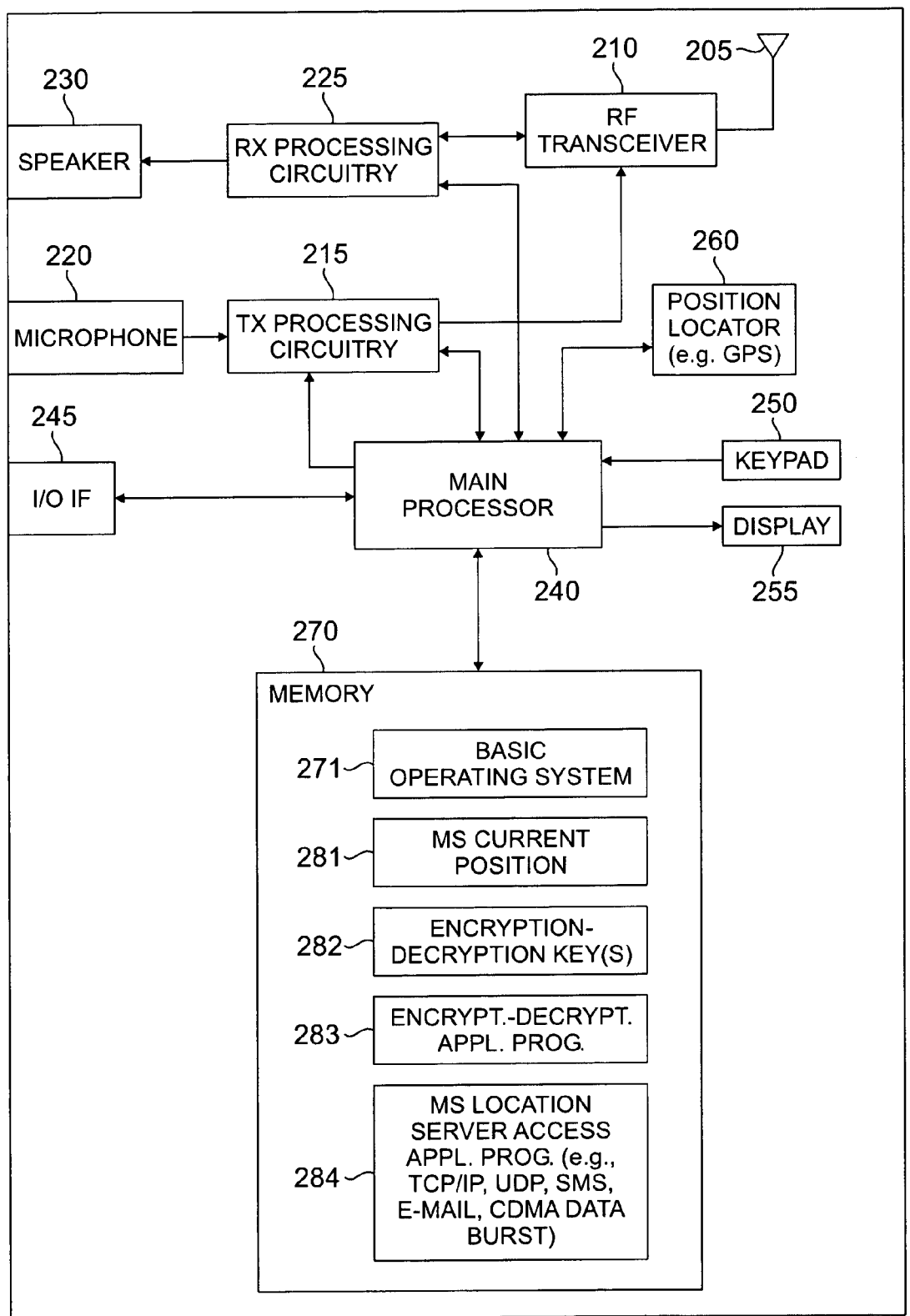
FIG. 2 illustrates an exemplary wireless mobile station in greater detail according to one embodiment of the present invention.

FIG. 2 illustrates exemplary wireless mobile station 111 in greater detail according to one embodiment of the present invention. Wireless mobile station 111 comprises antenna 205, radio frequency (RF) transceiver 210, transmitter (TX) processing circuitry 215, microphone 220, receiver (RX) processor circuitry 225, speaker 230, main processor 240, input/output (I/O) interface (IF) 245, keypad 250, display 255, and position locator 260, which may be, for example, a global positioning system (GPS) receiver. Wireless mobile station 111 further comprises memory 270, that stores basic operating system (OS) program 271, MS current position file 281, encryption-decryption key(s) file 282, encryption-decryption application program 283, and MS location server access application program 284.

Wireless mobile station 111 may be a cell phone, a personal digital assistant (PDA) device equipped with a wireless modem, a two-way pager, a personal communication system (PCS) device, or any other type of wireless mobile station.

RF transceiver 210 receives, from antenna 205, an incoming RF signal transmitted by a base station of a wireless communication network. RF transceiver 210 down-converts the incoming RF signal to produce an intermediate frequency (IF) or a baseband signal. The IF or baseband signal is sent to RX processing circuitry 225 that produces a processed baseband signal by filtering, decoding, and/or digitizing the baseband or IF signal to produce a processed baseband signal. RX processing circuitry 225 transmits the processed baseband signal to speaker 230 (i.e., voice data) or to main processor 240 for further processing (i.e., web browsing).

TX processing circuitry 215 receives analog or digital voice data from microphone 220 or other outgoing baseband data (i.e., web data, e-mail, interactive video game data) from main processor 240. TX processing circuitry 215 encodes, multiplexes, and/or digitizes the outgoing baseband data to produce a processed baseband or IF signal.

RF transceiver 210 receives the outgoing processed baseband or IF signal from TX processing circuitry 215. RF transceiver 210 up-converts the baseband or IF signal to an RF signal that is transmitted via antenna 205.

Main processor 240, in one embodiment, is a microprocessor or microcontroller. Main processor 240 executes basic OS program 271 in order to control the overall operation of wireless mobile station 111. In one such operation, main processor 240 controls the reception of forward channel signals and the transmission of reverse channel signals by RF transceiver 210, RX processing circuitry 225, and TX processing circuitry 215, in accordance with well known principles. Main processor 240 is also capable of controlling and/or interfacing with position locator 260 in order to transfer the determined location to memory 270 or to TX processing circuitry 215.

Main processor 240 is capable of executing other processes and programs that are resident in memory 270. Main processor 240 can move data into or out of memory 270, as required by an executing process. Main processor 240 is also coupled to I/O interface 245. I/O interface 245 provides the mobile station with the ability to connect to other devices such as laptop computers and handheld computers. I/O interface 245 is the communication path between these accessories and main controller 240.

Main processor 240 is also coupled to keypad 250 and display unit 255. Keypad 250 is used by the end-user of the mobile station to enter data into the mobile station. Display 255, in the preferred embodiment, is a liquid crystal display capable of rendering text and/or at least limited graphics from Web sites. Alternate embodiments use other types of displays.

Memory 270 is coupled to main processor 240. Memory 270 may be comprised of solid-state memory such as random access memory (RAM), various types of read only memory (ROM), or Flash RAM. Memory 270 may also include other types of memory such as micro-hard drives or removable storage media that stores data.

Memory 270 stores basic operating system 271 that provides the basic operational control of mobile station 111. MS current position 281 indicates the current location of mobile station 111. Various methods used to provide the current location are discussed subsequently.

Memory 270 also stores encryption-decryption key(s) 282 that are used to access MS current position 281. The use of encryption-decryption keys enables the mobile station to give its location out only to those having authorization from the mobile station user. In an alternate embodiment, passwords or personal identification numbers may be used to keep the location information confidential Encryption-decryption application program 283 is stored in memory 270 in order to compare any received keys with encryption-decryption keys 282. If a match occurs, the location is decrypted. If a match does not occur, the position of the mobile station remains encrypted. The operation of this feature is discussed subsequently with reference to the flow diagram of FIG. 4.

Memory 270 additionally stores MS location server access application program 284. This program provides the mobile station access to the MS location server that was illustrated in FIG. 1. MS location server access application program 284 may be an e-mail program (e.g., EUDORA), a Transmission Control Protocol/Internet Protocol (TCP/IP) program, a User Datagram Protocol (UDP) program, a short messaging service (SMS) program, a CDMA data burst program, or any combination of these programs. These various types of communication programs are for illustration purposes only. The present invention is not limited to any one type or combination of server access programs.

Figure 3:
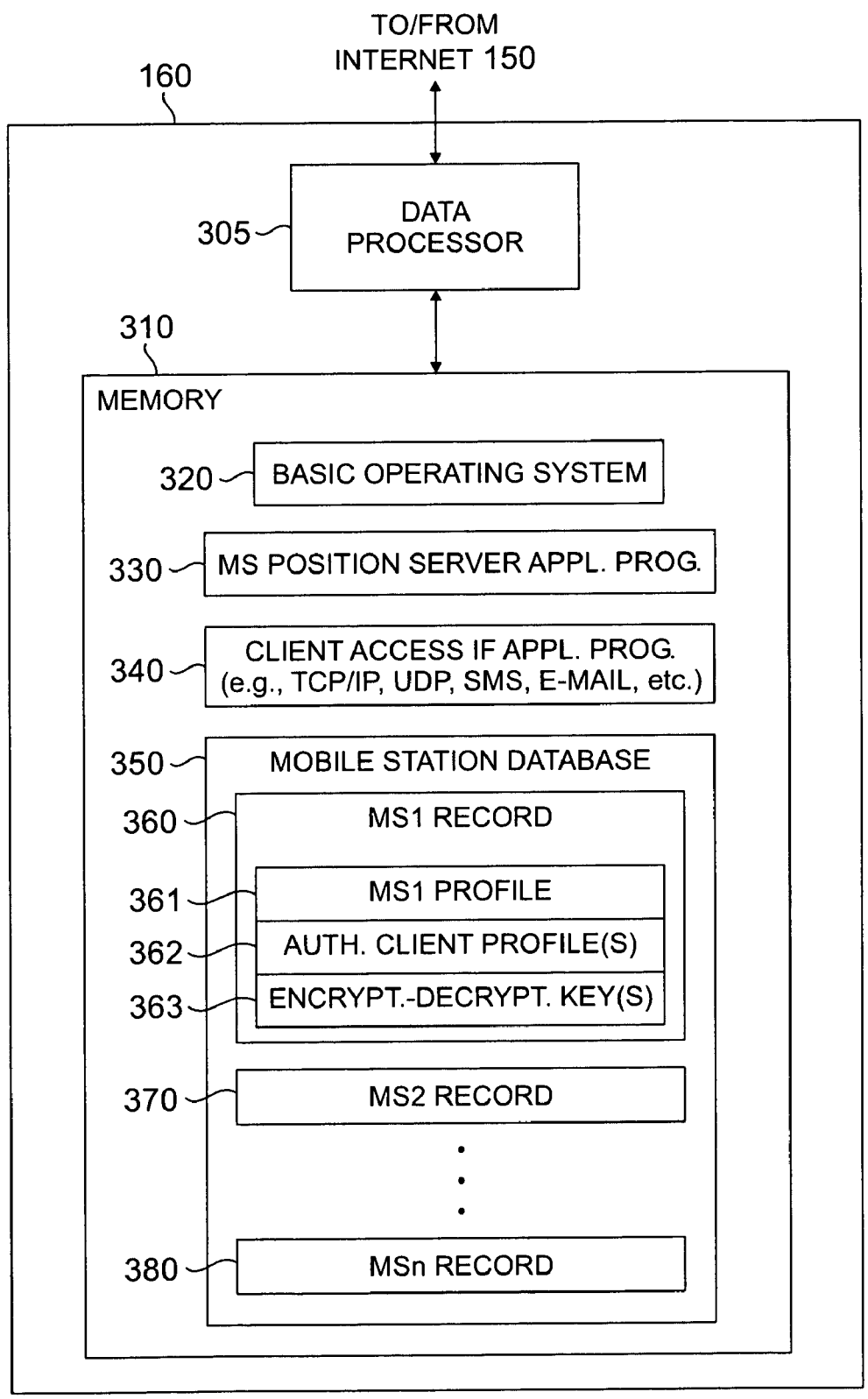
FIG. 3 illustrates the exemplary mobile station (MS) location server in greater detail according to one embodiment of the present invention.

FIG. 3 illustrates exemplary mobile station (MS) location server 160 in greater detail according to one embodiment of the present invention. MS location server 160 comprises data processor 305 and memory 310. Data processor 305, in one embodiment, is a microprocessor or microcontroller. Other embodiments use other types of controllers, such as parallel processors, for greater processing power. Data processors are well known in the art and are not discussed further.

Memory 310 may be comprised of solid-state memory such as random access memory (RAM), various types of read only memory (ROM), or Flash RAM. Memory 310 may also include other types of memory such as micro-hard drives or removable storage media that stores data.

Memory 310 is coupled to data processor 305 and stores basic operating system 320, MS position server application program 330, client access interface (IF) application program 340, and mobile station database 350. Mobile station database 350 contains N mobile station records, including exemplary mobile station records 360, 370 and 380, which are arbitrarily labeled MS1 Record, MS2 Record, and MSn Record, respectively.

Exemplary mobile station record 360 contains MS1 profile field 361, authorized client profile(s) field 362, and encryption-decryption key(s) 363. Exemplary mobile station records 370 and 380 contain similar data fields.

Figure 4:
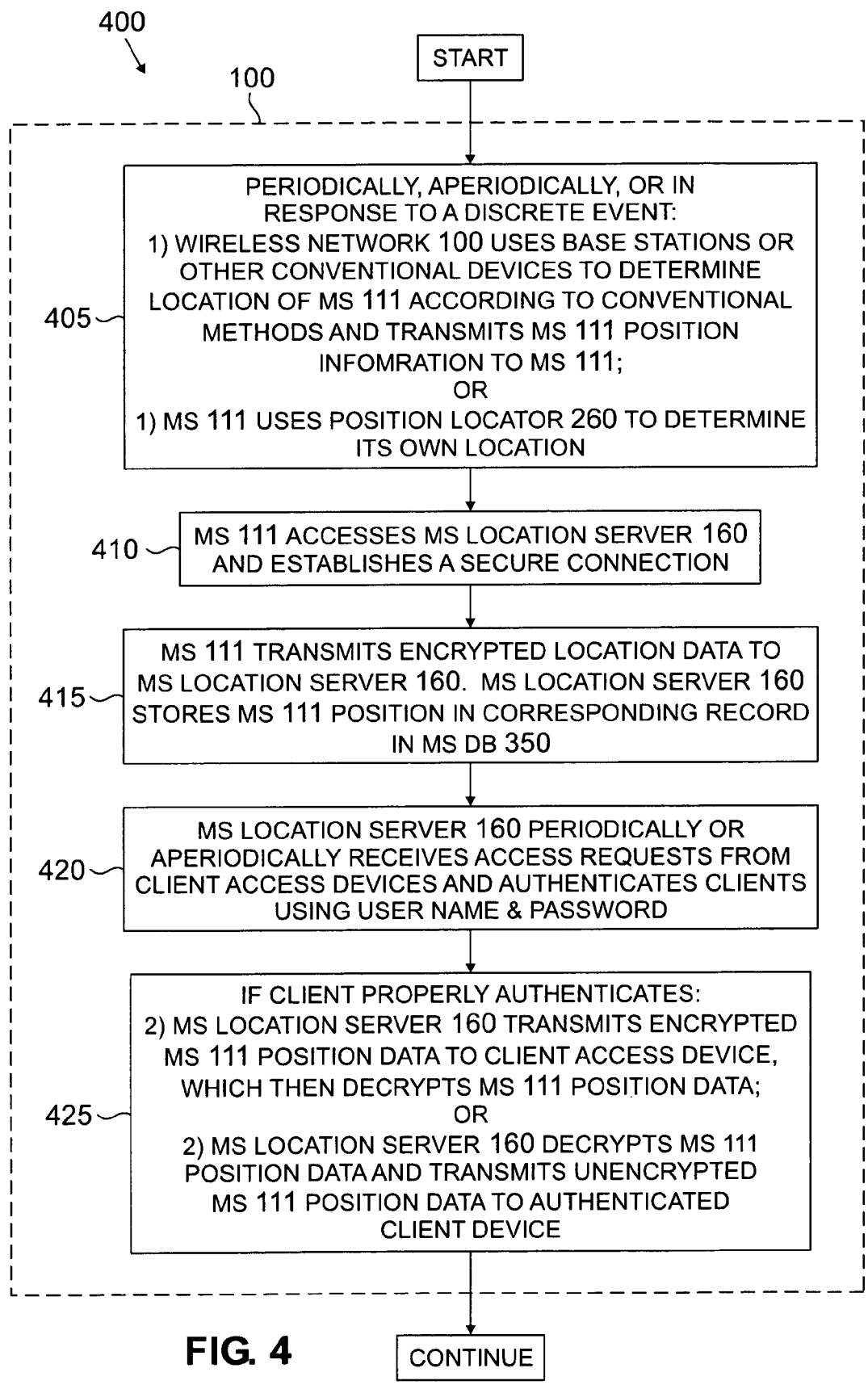
FIG. 4 is a flow diagram illustrating the operation of the exemplary mobile station and the exemplary MS location server according to one embodiment of the present invention.

Basic operating system 320 is run by data processor 305 in order to control the overall operation of the location server. MS position server application program 330, as illustrated in greater detail in FIG. 4, is responsible for controlling access to the location information from the mobile station. In one embodiment, MS position server application program 330 may determine when and how often to query the mobile station in order to retrieve the location information.

MS position server application program 330 may also be responsible for controlling access to mobile station database 360. For example, if a request is received for location information for a particular mobile station, that request must contain a proper decryption key. MS position server application program 330 determines if that decryption key is accurate so that the requesting entity can access the location information.

Client access IF application program 340 may be comprised of an e-mail program (e.g., EUDORA), a Transmission Control Protocol/Internet Protocol (TCP/IP) program, a User Datagram Protocol (UDP) program, a short messaging service (SMS) program, a CDMA data burst program, or any combination of these programs. These various types of communication programs are for illustration purposes only. The present invention is not limited to any one type or combination of server access programs.

The mobile station profile 361 contains the geographic location information for that particular mobile station. This profile may also be comprised of additional information that relates to the mobile station such as information about the subscriber.

The authorized client profile 362 is comprised of a list of clients that are authorized to have access to MS1's record 360. This authorized client profile 362 may contain additional information regarding these client devices as well.

Encryption/decryption keys 363 comprises the list of keys that can be used to access MS1 record 360. This list may be one key or any number of keys that can be used.

FIG. 4 depicts flow diagram 400, which illustrates the operation of mobile station 111 and MS location server 160 according to one embodiment of the present invention. In the normal course of operation, wireless network 100 will periodically, aperiodically, or in response to a discrete event, use base stations or other conventional monitoring devices to determine the location of MS 111 according to conventional methods. Wireless network 100 then transmits MS 111 position information to MS 111. Alternatively, MS 111 will periodically, aperiodically, or in response to a discrete event, use position locator 260 to determine its own location (process step 405). In either event, once MS 111 contains its own position information, MS 111 accesses MS location server 160 and establishes a secure connection (process step 410). MS 111 then transmits encrypted location data to MS location server 160.

MS location server 160 stores the encrypted MS 111 position data in a corresponding record in mobile station database 350 (process step 415). Thereafter, MS location server 160 may periodically or aperiodically receive access requests from client access devices. MS location server 160 then authenticates the client access devices using user name and password verification procedures (process step 420). In one embodiment of the present invention, if the client access device properly authenticates, MS location server 160 transmits the encrypted MS 111 position data to the client access device, which then decrypts the MS 111 position data. In an alternate embodiment of the present invention, MS location server 160 decrypts the MS 111 position data and transmits unencrypted MS 111 position data to authenticated client device (process step 425).

In summary, a secure distribution of mobile station location information is provided by the method and apparatus of the present invention. This location distribution can be used by service providers in order to generate additional revenue.

For example, a service provider may sell the information on pay-per-use basis or subscription basis to companies wishing to market products and/or services to mobile station users in a certain geographic area. Business travelers can use the information to automatically download locations of certain nearby services such as car rentals companies, hotels, or automobile service facilities.

Parents can use the present invention to keep track of children. Businesses can track delivery personnel so they know which delivery person to use to ensure a quicker response to customers.

Although the present invention has been described in detail, those skilled in the art should understand that they can make various changes, substitutions and alterations herein without departing from the spirit and scope of the invention in its broadest form.

What is claimed is:

1. For use in a mobile station capable of accessing a wireless network, an apparatus for transferring geographic location information associated with said mobile station to a server accessible via a communication network coupled to said wireless network, said apparatus composing:
    memory that comprises mobile station current position information and at least one encryption/decryption key; and
    a controller, coupled to the memory, that is capable of determining the geographic location information and storing it in the memory, the controller additionally capable of establishing a secure connection with the server, using the at least one encryption/decryption key, over the wireless network over which the geographic location information is transmitted.

2. The apparatus as set forth in claim 1 and further including a position locator that establishes said geographic location information for said controller.

3. The apparatus as set forth in claim 2 wherein said position locator is a global positioning system receiver.

4. The apparatus as set forth in claim 1 wherein controller is capable of determining the geographic location periodically.

5. The apparatus as set forth in claim 1 wherein controller is capable of determining the geographic location aperiodically.

6. The apparatus as set forth in claim 1 wherein said controller is capable of determining the geographic location in response to a discrete event.

7. The apparatus as set forth in claim 1 wherein said controller is capable of determining said geographic location from the server.

8. The apparatus as set forth in claim 1 wherein said memory further comprises a server access application program and an encryption/decryption application program.

9. For use in a network server, an apparatus for transferring mobile station geographic location information associated with said mobile station to an authorized client access device, said apparatus comprising:
    memory that comprises mobile station current position information and at least one encryption/decryption key; and
    a data processor, coupled to the memory, that is capable of storing the geographic location information in the memory, the data processor additionally capable of establishing a secure connection with the mobile station, using the at least one encryption/decryption key, over the wireless network over which the geographic location information is transmitted.

10. The apparatus as set forth in claim 9 wherein said data processor is capable of determining said geographic location information using a geographic location determination technique.

11. The apparatus as set forth in claim 9 wherein said memory further comprises a mobile station record having a mobile station profile, an authorized client profile, and an encryption/decryption key.

12. The apparatus as set forth in claim 11 wherein the mobile station profile comprises the geographic location information.

13. The apparatus as set forth in claim 9 wherein the controller is further capable of transmitting the geographic location information to the authorized client device in response to an authorized request from the authorized client device.

14. The apparatus as set forth in claim 13 wherein the authorized request comprises a password.

15. For use in a network server that is capable of communicating with a mobile station via a wireless network, a method of distributing mobile station geographic location information, the method comprising the steps of:
    determining the mobile station geographic location information;
    storing the mobile station geographic location information in a database in memory;
    receiving an access request from a client access device for the geographic location information;
    authenticating the access request for the geographic location information; and
    transmitting the geographic location information to the client access device in response to an authentic access request.

16. The method as set forth in claim 15 wherein the step of determining the geographic location information comprises receiving the geographic location information in an encrypted form from the mobile station over a secure connection.

17. The method as set forth in claim 15 wherein the step of determining the geographic location information comprises the steps of:
    determining the geographic location information using a triangulation technique;
    storing the geographic location information in memory; and
    transmitting the geographic location information to the mobile station.

18. The method as set forth in claim 15 wherein the step of transmitting comprises transmitting encrypted geographic location information to the client access device.

19. The method as set forth in claim 15 wherein the step of authenticating comprises determining if a password from the client access device is authentic.

20. The method as set forth in claim 15 wherein the step of authenticating comprises determining if a decryption key from the client access device is authentic.

* * * * *